Jan. 19, 1960

L. DUBIN 2,922,081

COMPONENT SUPPORT STRUCTURE

Filed March 18, 1957

INVENTOR.
Lester Dubin
BY Morgan, Finnegan,
Durham & Pine

ATTORNEYS

United States Patent Office 2,922,081

Patented Jan. 19, 1960

2,922,081

COMPONENT SUPPORT STRUCTURE

Lester Dubin, Pelham Manor, N.Y., assignor to Lambda Electronics Corporation, College Point, N.Y., a corporation of New York Application March 18, 1957, Serial No. 646,765

6 Claims. (Cl. 317—99)

This invention relates to component support structures and more particularly to electrical component support structures suitable for mounting in racks or cabinets.

In assemblies of electrical and electronic apparatus it is common practice to arrange the equipment in bays on vertical racks or frames or in cabinets in order to save space and for ease of operation. Due to the increasing complexity of modern electrical and electronic equipment, it has become increasingly more difficult to mount the equipment in the usual amount of space which is available. In particular, power supplies which supply the power to operate the equipment have become large, heavy and bulky and increasing amounts of panel and cabinet space are required at the expense of the remaining equipment. While the problem is particularly acute for rack mounted power supplies, the same problem exists in mounting other types of electrical and electronic apparatus.

Therefore, an object of this invention is to provide an improved component support structure for supporting electrical and electronic apparatus.

A specific object of this invention is to provide an improved power supply support structure which occupies a minimum amount of front panel and cabinet space.

A more general object of the invention is to provide a component support structure for relatively heavy electrical components which is particularly compact and space saving.

Other objects of the invention will be obvious or may be learned by practice with the invention, the same being realized and attained by means of the combinations, improvements and instrumentalities pointed out in the appended claims.

The invention consists of the novel parts, constructions, arrangements, combinations and improvements herein shown and described.

Briefly, the invention is embodied in a component support structure comprising a unitary wraparound support cover of rectangular cross section. A component support deck is rigidly attached within and perpendicular to the sides of the support structure. Electrical components such as heavy transformers are mounted on the component support deck and extend into the space within the support cover. Means, such as a front panel, rigidly connects the support cover to the rack or cabinet. The unitary wraparound support cover and rigid support deck provide a particularly rugged structure which permits heavy components such as transformers to be mounted a substantial distance from and extending toward the rack. Thus, a minimum amount of front panel and cabinet space is occupied.

An advantage of the invention is that the support cover also functions as a dust cover as well as providing for the rapid conduction of heat away from the electrical components.

Another advantage of the invention is that, since the component support deck is attached within the support cover, a recess is provided for the terminals of the electrical components mounted on the component support deck.

A feature of the invention resides in a movable component support deck which is hingeably connected at the rear of the support cover and adapted to be positioned over the recess. Thus, components such as electronic tubes may be mounted to extend rearward from the movable deck with the associated terminals extending into the recess when the movable deck is in position. This protects the terminals from accidental damage and is a safety measure for reducing accidental electric shock.

An advantage of the movable component support deck feature is that substantially all of the terminals are available for servicing when the movable deck is moved away from the recess.

Another feature of the invention resides in side extensions of the support cover which extend rearward from the support cover and have a length greater than the length of the electron tubes. The side extensions function to minimize accidental damage to the electron tubes during shipping and during operation of the equipment.

An advantage of this feature of the invention is that the side extensions can also be used as legs to support the power supply in a vertical position during maintenance and repair.

In order to illustrate the surprising saving of space by electrical component support structures designed in accordance with the invention, a specific power supply capable of delivering four hundred watts of D.C. power and one hundred and twenty watts of A.C. filament power occupies a total panel height of only seven inches using a standard nineteen inch rack mounting.

The invention in its broader aspects is not limited to the specific combinations, improvements and instrumentalities described, but departures may be made therefrom within the scope of the accompanying claims without departing from the principles of the invention and without sacrificing its chief advantages.

Other objects, features and advantages of the invention will be apparent from the following detailed description which is accompanied by a drawing wherein.

Figures 1, 2:
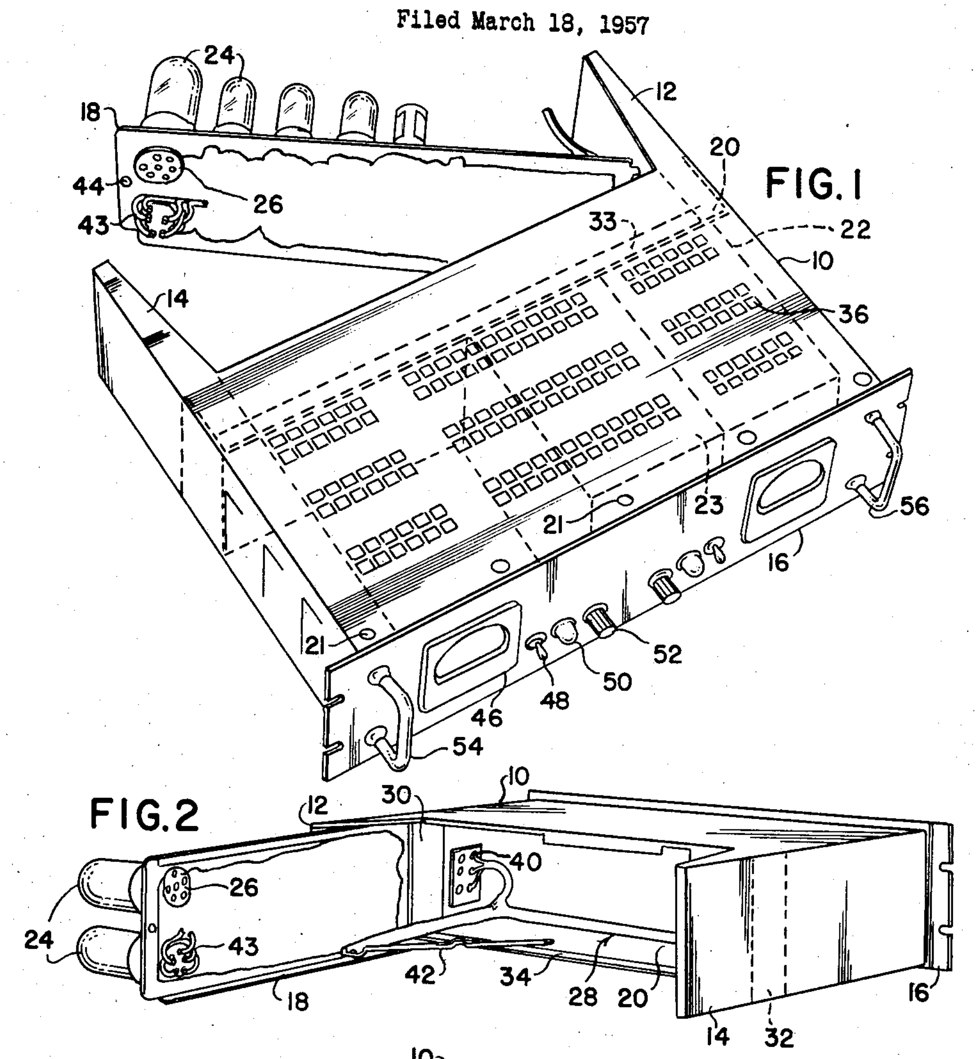
Figure 1 is a perspective view of a power supply support structure in accordance with a preferred embodiment of the invention, showing the unitary wraparound support cover, the rigid component support deck (in dotted outline), the movable component support deck and the side extensions.
Figure 2 is a rear perspective view of the power supply shown in Figure 1 with the movable component support deck swung away illustrating the recess behind the rigid component support deck and the complete accessibility of the terminals for servicing.

Referring to Figures 1 and 2, a support structure for a power supply is shown in accordance with the preferred embodiment of the invention. The power supply generally comprises the unitary wraparound support cover 10 having the side extensions 12 and 14 which extend rearward. A panel 16 is attached to the support cover 10 at the front and a movable component support deck 18 is hingeably connected at the rear of the support cover 10. A fixed component support deck 20 (shown in dotted outline in Fig. 1) is permanently and rigidly connected within support cover 10 perpendicular to the sides of the support cover 10.

The fixed deck 20 supports a plurality of electrical components such as the power transformer 22 and the filament transformer 23 as shown in dotted outline, which extend from the fixed deck 20 into the space within the support cover 10 between the fixed deck 20 and the panel 16. Other electrical components such as the electron tubes 24 are mounted in sockets such as the sockets 26 which are permanently mounted on the movable deck 18. The electron tubes 24 which operate at a particularly high temperature are readily cooled by air circulation since there are no adjacent components to restrict air circulation.

Figures 3, 4:
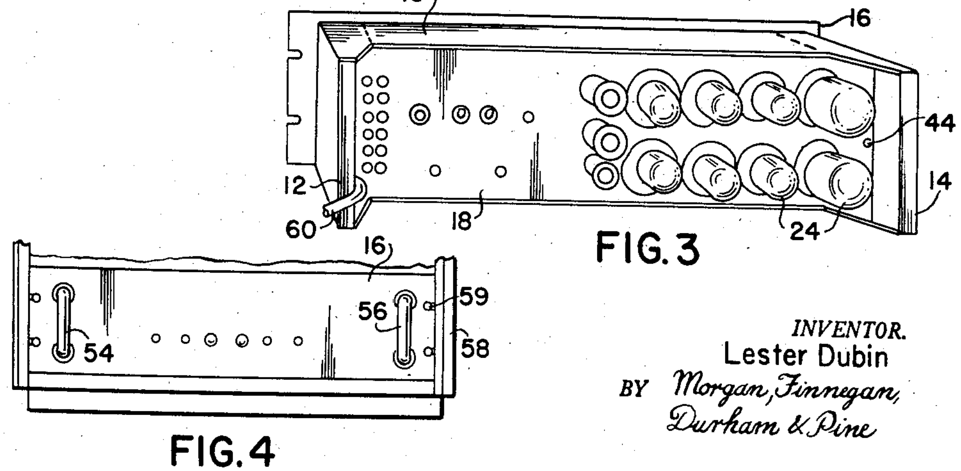
Figure 3 is a rear view of the power supply with the movable component support deck in position, and showing how the side extensions protect the electron tubes from accidental damage.
Figure 4 is a front view of a power supply in a typical rack installation illustrating the economy in panel space achieved by component support structures designed in accordance with the invention.

The unitary wraparound support cover 10 has a rectangular cross-section so that the front opening is covered by the panel 16 and the rear opening is covered by the fixed deck 20 which is positioned inside the rear edge of the support cover 10 to form a recess 28 (Fig. 2). The panel 16 is rigidly connected to the support cover 10 by means of screws such as the screws 21 (Fig. 1) which screw the top and bottom of the support cover 10 to corresponding angle extension portions of the panel 16. The fixed deck 20 is in the form of a pan or chassis having bent sides 30 and 32 (Fig. 2) welded to the inside of the support cover 10. The remaining sides 33 (shown in dotted outline in Fig. 1) and 34 (Fig. 2) are welded to the top and bottom sides respectively of the support cover 10. The result of welding the fixed deck 20 within the support cover 10 is to produce a very strong and rigid structure which will not twist or bend due to the heavy electrical components which are mounted on the fixed deck 20. This is particularly true even though the fixed deck 20 is a relatively long distance away from the panel 16 which is used to mount the power supply in a rack as is shown in Fig. 4. The support cover 10 and side extensions 12 and 14 are of unitary construction which adds to the strength of the component support structure.

It is important to minimize the stress where the support cover 10 is attached to the panel 16. An advantage of mounting the heavy components on the fixed deck 20 so that they extend toward the panel 16 is that the weight of the heavy components produces a stress which is opposed to the stress produced by the remaining structure. For example, the weight of the heavy components mounted on the fixed deck 20 results in a stress directed toward the panel 16 where it is connected to the top of the support cover 10 while the remaining structure exerts a stress directed away from the panel 16 at that location.

The support cover 10 also functions to cool the electrical components by conducting heat away from the fixed deck 20. The ventilating holes, such as the holes 36, are provided in the support cover 10 to aid in cooling the electrical components. The support cover 10 also functions as a dust cover and therefore eliminates the need for a cabinet. Electrical components such as the power transformer 22 and filament transformer 23 are mounted on the fixed deck 20 with their associated terminals such as terminals 40 (Fig. 2) extending into the recess 28. A choke and filter capacitors may also be mounted on the fixed deck 20.

Electrical components such as the electron tubes 24 (Fig. 2) mounted on the movable deck 18 have their associated terminals such as terminals 43 extending into the recess 28 when the movable deck 18 is in operating position over the rear opening of the support cover 10 as shown in Figure 3. Thus, the terminals within the recess 28 are protected from accidental damage and the hazard of electric shock is reduced.

The extensions 12 and 14 (Fig. 3) extend beyond the electron tubes 24 and function to prevent the electron tubes from being damaged accidentally during shipping and operation. The side extensions 12 and 14 also function as legs to support the power supply in a vertical position for storage and for maintenance and repair.

When the power supply is rack mounted as is shown in Figure 4, it may readily be serviced by swinging the movable deck 18 (Fig. 2) away from the rear opening of the support cover 10 to disclose substantially all of the terminals of the electrical components which comprise the power supply. The deck stop 42 maintains the movable deck in open position during servicing. A lock bolt 44 (Fig. 3) locks the movable deck 18 in the operating position.

Other electrical components such as the meter 46 (Fig. 1), switch 48, the pilot light 50, and the fuse 52 may be mounted on the panel 16 as shown. However, in some installations meters are not required as shown in Figure 4. The handles 54 and 56 (Figs. 2 and 4) are provided to facilitate mounting of the power supply into the rack 58 using bolts such as the bolt 59 to screw the panel 16 against the vertical supports which comprise the rack 58. The power cable 60 (Fig. 3) is provided to feed electrical power to the power supply.

In summary, since the support cover 10 and the rigidly connected fixed deck 20 are very rugged, relatively large and heavy power and filament transformers may be mounted on the fixed deck 20 a substantial distance from the panel 16 even though a relatively long lever arm situation exists. This rugged construction permits the panel 16 to occupy a minimum amount of panel space on the rack; for example, a ratio of panel height to panel width of 1 to 3 may be used in a support structure which supports relatively heavy power supply components. Further, the recess formed by connecting the fixed deck 20 within the support cover 10 provides space for terminals such as terminals 43 (Fig. 2). In addition, the removable deck 18 may readily be swung away to make the terminals and the wires readily accessible for servicing, and electron tubes 24 may readily be removed for testing. The side extensions 12 and 14 function to protect the electron tubes and as legs to support the power supply in a vertical position. The entire power supply assemblage is compact and therefore occupies a minimum of cabinet space as well as panel space.

While the illustrated power supply is shown with a panel 16, it should be noted that the panel 16 is not required in other embodiments of the invention in which the support cover 10 is connected directly to the rack by suitable mounting means. It should also be noted that the invention is not restricted to power supplies but may be used as an electrical component support structure for other types of electrical and electronic apparatus.

The following specifications are given, by way of example only, of a rack mounted power supply in accordance with a specific commercial embodiment of the invention:

| | |
|---|---|
| Height x width x depth | 7 x 19 x 14¾ inches. |
| Weight (total) | 84 pounds. |
| Weight of components on fixed deck | 53 pounds. |
| Fixed deck to front panel distance | 10 inches. |
| Height x width x depth of support cover (excluding side extensions) | 6$\frac{9}{16}$ x 17 x 9⅞ inches. |
| Length of side extensions | 4½ inches. |
| Voltage range (D.C.) | 325–525 volts. |
| Current range (D.C.) | 0–800 milliamperes. |
| Filament voltage output (6.3 volts) | 20 amperes. |
| Maximum D.C. power output | 420 watts. |
| Maximum A.C. power output | 126 watts. |

Thus, in accordance with the invention, an improved component support structure for supporting electrical and electronic apparatus has been provided which is compact and therefore occupies a minimum amount of front panel and cabinet space.

Although the invention has been disclosed in connection with a single embodiment, it will be apparent that many modifications and changes may be readily made without departing from the spirit and scope of the invention.

What is claimed is:

1. In a component support structure, means for providing an assemblage of electrical components with compactness, accessibility, heat dissipation characteristics, and structural strength comprising a wrap-around support cover having four orthogonal sides joined at four parallel edges of said sides to form a continuous box-shaped chassis which substantially encloses said component support structure, a front panel attached over the opening at one end of said wrap-around support cover, a fixed component support deck fixedly attached to and within said wrap-around support cover and spaced rearwardly from said front panel to form a front compartment, said fixed component support deck being substantially perpendicular to the sides of said wrap-around support cover, a plurality of electrical components mounted on said fixed component support deck and extending forwardly into said front compartment, a movable component support panel movably connected to a side of said wrap-around support cover rearwardly of said fixed support deck and spaced therefrom to form a second compartment, said movable panel including a plurality of electrical components mounted thereon, said movable panel and said fixed deck comprising some terminals on their facing surfaces which are electrically connected with some of the components adjacent said terminals.

2. An arrangement according to claim 1, in which said electrical components on said fixed deck are substantially heavier than the electrical components on said movable panel.

3. An arrangement according to claim 1, in which said electrical components on said fixed deck comprise heavy parts such as transformers while said electrical components on said movable panel comprise substantially lighter parts such as vacuum tubes.

4. An arrangement according to claim 1, in which said front compartment is substantially larger than said second compartment.

5. An arrangement according to claim 1, in which said fixed component support deck is welded to said wrap-around cover to provide intimate contact therebetween, said cover thus constituting a heat sink.

6. An arrangement according to claim 1, in which electrical indicators and switches are mounted on said front panel.

References Cited in the file of this patent

UNITED STATES PATENTS

| | | |
|---|---|---|
| 1,809,025 | Cruser | June 9, 1931 |
| 2,152,589 | Hass | Mar. 28, 1939 |
| 2,567,740 | Smith | Sept. 11, 1951 |
| 2,760,122 | Harris | Aug. 21, 1956 |

OTHER REFERENCES

Lambda Catalog 55 (publication), May 1955.